United States Patent [19]
Ketchum

[11] Patent Number: 6,114,995

[45] Date of Patent: *Sep. 5, 2000

[54] COMPUTER-IMPLEMENTED METHOD AND APPARATUS FOR AUTONOMOUS POSITION DETERMINATION USING MAGNETIC FIELD DATA

[75] Inventor: Eleanor A. Ketchum, Catonsville, Md.

[73] Assignee: The United States of America as represented by the Administrator of the National Aeronautics and Space Administration, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 09/010,190

[22] Filed: Jan. 21, 1998

Related U.S. Application Data

[60] Provisional application No. 60/035,949, Jan. 21, 1997.

[51] Int. Cl.$^7$ .................................................. G01S 3/02
[52] U.S. Cl. ................... 342/457; 342/451; 342/357.04; 701/207; 701/222; 701/226
[58] Field of Search ..................................... 342/457, 451, 342/357.04; 701/207, 222, 226

[56] References Cited

U.S. PATENT DOCUMENTS

| | | |
|---|---|---|
| 5,614,913 | 3/1997 | Nichols et al. . |
| 5,957,982 | 9/1999 | Hughes et al. .............................. 701/13 |

OTHER PUBLICATIONS

M. Challa, G. Natanson, D. Baker and J. Deutschmann, "Advantages of Estimating Rate Corrections During Dynamic Propagation of Spacecraft Rates—Applications to Real–Time Attitude Determination of SAMPEX." Proceedings of the Flight Mechanics/Estimation Theory Symposium 1994, NASA Conference Publication No. 3265, pp. 481–495, NASA Goddard Space Flight Center, Greenbelt MD, May 1994.

*Primary Examiner*—Theodore M. Blum

[57] ABSTRACT

A computer-implemented method and apparatus for determining position of a vehicle within 100 km autonomously from magnetic field measurements and attitude data without a priori knowledge of position. An inverted dipole solution of two possible position solutions for each measurement of magnetic field data are deterministically calculated by a program controlled processor solving the inverted first order spherical harmonic representation of the geomagnetic field for two unit position vectors 180 degrees apart and a vehicle distance from the center of the earth. Correction schemes such as a successive substitutions and a Newton-Raphson method are applied to each dipole. The two position solutions for each measurement are saved separately. Velocity vectors for the position solutions are calculated so that a total energy difference for each of the two resultant position paths is computed. The position path with the smaller absolute total energy difference is chosen as the true position path of the vehicle.

25 Claims, 9 Drawing Sheets

COMPUTER-IMPLEMENTED METHOD AND APPARATUS FOR AUTONOMOUS POSITION DETERMINATION USING MAGNETIC FIELD DATA

CROSS REFERENCE TO RELATED APPLICATIONS

This application claims the benefit of priority under 35 U.S.C. Section 119 (e) to U.S. Provisional application Ser. No. 60/035,949, filed Jan. 21, 1997.

GOVERNMENT RIGHTS

The invention described herein was made by an employee of the United States Government. It may be manufactured and used by or for the Government for governmental purposes without the payment of any royalty thereon or therefor.

DOCUMENTS INCORPORATED BY REFERENCE

This application is based in part on "Autonomous Navigation Recovery for Fine Pointing Low Earth Orbiting Spacecraft", a dissertation submitted to the Faculty of the School of Engineering and Applied Science of The George Washington University in partial satisfaction of the requirements for the degree of Doctor of Science, by Eleanor Ketchum Silverman, December, 1997, unpublished, and which is incorporated by reference. The following document is incorporated by reference, "Autonomous Deterministic Spacecraft Positions Using the Magnetic Field and Attitude Information" by Eleanor Ketchum, ION National Technical Meeting, Jan. 22–24, 1996, published in the publication "Proceedings of 1996 National Technical Meeting", April, 1996. The computer code in Appendix A is also incorporated by reference. "Autonomous Spacecraft Orbit Determination Using the Magnetic Field and Attitude Information" by Eleanor Ketchum, 19th Annual American Astronautical Society Guidance and Control Conference, Feb. 7–11, 1996, AAS 96-005 is also incorporated by reference.

BACKGROUND

The field of the invention is autonomous navigation systems for determining position based on inputs of magnetic field and attitude data without the use of Kalman Filters. The present invention may be used for earthbound objects such as submarines and balloons as well as for spacecraft.

In the context of autonomous spacecraft navigation, embodiments of the present invention are particularly useful in the context of low earth orbiting (LEO) spacecraft. All spacecraft navigation systems, at times, cannot determine their location. When this occurs, a spacecraft may have to rely on ground operations personnel to upload a position fix via a communications link. Because of the lack of navigation data, this communications link may be difficult for the spacecraft to establish. If the spacecraft cannot recover its orbit, instruments onboard the spacecraft may become damaged, or worse, the spacecraft maybe lost. To avoid this situation, systems for a spacecraft to autonomously recover its position data, meaning without being supplied information externally, have been developed.

One solution would be to put Global Positioning System Receivers on spacecraft. However, space qualified GPS Receivers have not as of the date of filing of this application been successfully demonstrated in space. In addition, the power increase of fifteen Watts and the expense would be impractical for many spacecraft, particularly small LEO spacecraft. Moreover, many LEO spacecraft, such as those of the Small Explorer (SMEX) Program at the NASA Goddard Space Flight Center, only need to know their positions to within one hundred (100) kilometers, for contacting ground stations for instance, rather than to the accuracy in the hundreds of meters provided by GPS Receivers.

Instead of putting new hardware on small spacecraft, software solutions used in conjunction with already existing hardware on spacecraft have been explored. One such method of determining position onboard a spacecraft used a transponder with either tracking satellite or ground station data. (See Gramling, C., et al, "TDRSS Onboard Navigation System (TONS) Flight Qualification Experiment," Proceedings of the 1994 Flight Mechanics and Estimation Theory Symposium, Greenbelt, Md., May 1994, pp. 253–267 and Gramling, C. "Autonomous Navigation Integrated with NASA Communication Systems," Proceedings of the 19th Annual AAS Guidance and Control Conference, Breckenridge, Colo., February, 1996, Paper No. AAS 96-006.) Although the method is cost effective for transponder users, it can take 12 hours to a full day to converge on an initial position solution due to poor visibility. The method is also Kalman Filter based so that it requires a priori position information.

Software methods to autonomously determine position, have been developed to use magnetic field data provided by magnetometers, which are already required by most spacecraft for momentum management. Methods have been developed which sequentially filter magnetic field data provided by magnetometers with extended Kalman Filters. Position estimates with the use of Kalman Filters have been shown to provide positions to better than fifty 50 km using flight data, (See Shorsi, G., and Bar-Itzhack, I., "Satellite Autonomous Navigation Based on Magnetic Field Measurements", Journal of Guidance, Control, and Dynamics, Vol. 18, No, 4, July–August 1995, pp. 843–850) and even to better than one 1 km using simulated star tracker attitude information with simulated magnetic field measurements. (See Psiaki, M., "Autonomous Orbit and Magnetic Field Determination Using Magnetometer and Star Sensor Data," August, 1993, AIAA-93-3825-CP.)

However, these Kalman Filtering methods require an a priori knowledge of a position fix of the spacecraft for the filters to converge. Furthermore, the filters may take more than one hundred (100) minutes to converge on a solution and require extensive computing power. Computing power on a spacecraft must be shared with other necessary systems. For example, computing power onboard a SMEX spacecraft must be shared with every other subsystem, so it is safe to assume that only five 5 percent is available for the position determination process. In Psiaki, four iterations for a good guess and 25 iterations for a poor first guess (~2700 km error) which took 100 minutes, were obtained on a one 1 Mflop workstation. An upper end SMEX only has about 900 Kflops.

Obtaining a position fix of within 100 km accuracy in significantly less time than 100 minutes based on magnetometer data and attitude data without a priori knowledge of position is highly desirable in several contexts. For LEO spacecraft, the spacecraft would quickly be able to determine its position and with that knowledge, recover its orbit. A quickly obtained position fix would provide a good first guess as the a priori knowledge of position needed by a Kalman Filter based method, thereby decreasing time to convergence. Furthermore, a fine positioning spacecraft using GPS could also benefit from a real time coarse position estimate to decrease its time to a first position fix or offer a first when less than four (4) GPS space vehicles are visible.

SUMMARY

The present invention is a computer-implemented method and apparatus for finding a coarse position estimate for a vehicle using magnetic field measurements which addresses the above-mentioned shortcomings. The present invention is premised upon the Earth's magnetic field being modeled in terms of nth order spherical harmonics. In particular, the predominant or core portion of the field can be represented by the gradient of a scalar potential function, which in turn can be represented by a series of nth order spherical harmonics. From this representation as the gradient of a scalar potential function, one may derive equations to solve for a magnetic field vector at a certain position in terms of that position in geocentric inertial coordinates. The relationship was inverted so that given a measurement of the magnetic field in inertial space and the time of its measurement, two position solutions can be deterministically found. To get a coarse estimate of the position, the dipole, or first order model of the geomagnetic field is used, hereinafter called the dipole characterization of the earth's magnetic field. The two position solutions form an inverted dipole solution.

An object of the present invention is to provide a computer-implemented apparatus for autonomous position determination of a vehicle comprising a memory having data and a program controlled processor having a clock for generating timing pulses. The data of the memory comprises measurements of magnetic field data for three axes measured over a preset time period, times of the magnetic field measurements, and Gaussian coefficients of an nth order model of series of spherical harmonics representing the core portion of the magnetic field as a gradient of a scalar potential function. The processor comprises an inverted dipole solutions module which calculates an inverted dipole solution which comprises two position solutions. Each position solution is calculated for each measurement of the magnetic field and comprises a position vector for the vehicle and a vehicle distance from the center of the earth. Each inverted dipole solution is stored as data in memory. The processor further comprises a position determination module for determining a position for the vehicle from the data stored in memory.

An object of the present invention is to provide the apparatus described further comprising a magnetometer for providing measurements of the magnetic field data and an analog to digital converter for converting the measurements of the magnetometer into computer readable form. The processor further comprises a translation module for obtaining magnetic field data in a fixed reference coordinate system such as earth centered, earth fixed or geocentric inertial coordinates by translating the computer readable magnetic data from body coordinates to such a fixed reference coordinate system by using the attitude data. The translated magnetic field data is then stored in memory.

Another object of the present invention is to provide a computer-implemented method for autonomous position determination of a vehicle comprising several steps. The first step comprises a program controlled processor inputting a measurement of three axes magnetic field data, said magnetic field data being measured for a preset time period. Next, the processor determines whether there is a sufficient separation between the magnetic field vector of the measurement and a direction of a geomagnetic dipole according to a dipole characterization of the geomagnetic field in order for a correction scheme applied to a position solution to converge. The dipole characterization is a first order of a series of nth order spherical harmonics representing the geomagnetic field as a gradient of a scalar potential function.

These two steps are repeated until it is determined that a sufficient separation exists. Upon a sufficient separation, said processor performs the next step of calculating an inverted dipole solution for each measurement of three axes magnetic field data. Each of the two position solutions of an inverted dipole solution are stored in a separate set in memory. These steps are repeated for each measurement of the magnetic field data measured for the preset time period thereby creating two sets of position solutions propagating two position paths for the vehicle with different directions. The processor then determines which of the position paths is the true position path of the vehicle.

An object of the present invention is to provide a computer-implemented method for autonomous position determination further comprising these substeps, the first of which is determining two unit position vectors of the two position solutions in terms of the magnetic field vector and the direction of the dipole. The processor than calculates three possible solutions for the vehicle distance from the center of the earth from the magnetic field vector, the direction of the dipole and the total dipole strength of the geomagnetic field. Next the processor tests the three possible solutions to obtain one having a real nonnegative value for the vehicle distance from the center of the earth. The processor then applies a correction scheme to each of the two position solutions of the inverted dipole solution until a stopping criteria is satisfied.

Another object of the invention is to determine the true position path of the vehicle by the following steps. First, the processor determines a velocity vector for each position solution in each position path of the vehicle. Then a total energy for the position solution obtained from the first measurement of magnetic field data of the preset time period and a total energy for the position solution obtained from the last measurement of magnetic field data of the preset time period are calculated for each position path. A total energy difference is determined for each position path. The processor then tests whether one total energy difference is greater than a noise factor, a constant predetermined value for the vehicle. Upon determining that one total energy difference is greater than the noise factor and one is less that the noise factor, the position path having the total energy difference less than the noise factor is selected as the true position path of the vehicle, Another object of the invention is to provide a successive substitutions method having a stopping criteria of convergence within a number of iterations as a correction scheme.

Another object of the invention is to provide a computer-implemented apparatus for autonomous position determination of a terrestial entity comprising a magnetometer for providing a measurement of magnetic field data for three axes, an analog to digital converter for converting measurements of magnetic field data into computer readable form, and a memory comprising a hemisphere location of the entity. The memory further comprising attitude data used by a processor comprising a translation module for translating the computer readable magnetic data from body coordinates to a fixed reference coordinate system. The translated magnetic field data is stored in memory. Also stored in the memory are Gaussian coefficients of an nth order model of series of spherical harmonics representing the core portion of the magnetic field as a gradient of a scalar potential function. The processor further comprises an inverted dipole solutions module for calculating an inverted dipole solution comprising two position solutions, each position solution comprising a position vector for the entity and an entity distance from the center of the earth, for each measurement of three axes magnetic field data. The processor also comprises a position determination module for selecting a true position from the two position solutions based upon the hemisphere location stored in memory.

Another object of the invention is to provide a computer-implemented method for autonomous position determination of a terrestial entity comprising the following steps. The first step is obtaining a magnetic field measurement. The next is determining whether a sufficient separation exists between the magnetic field vector of the measurement and a direction of a geomagnetic dipole according to a dipole characterization of the geomagnetic field, to insure convergence of a correction scheme which will be applied to an inverted dipole position solution, wherein the dipole characterization is a first order of a series of nth order spherical harmonics representing the geomagnetic field as a gradient of a scalar potential function. Upon a determination of existence of the sufficient separation, the next step is to calculate an inverted dipole solution comprising two position solutions approximately 180 degrees apart, each position solution comprising a position vector for the entity and an entity distance from the center of the earth, for the measurement of three axes magnetic field data. Finally, a position is determined by selecting a true position from the two position solutions based upon a hemisphere location stored in a memory.

Another object of the present invention is to provide a computer-implemented method for autonomous position determination of a terrestial entity comprising a magnetometer obtaining a magnetic field measurement in body coordinates. The measurement is then converted to computer readable form by an analog to digital converter. Next the magnetic field data is translated to a fixed reference coordinate system by using attitude data stored in a memory, said memory further comprising a hemisphere location of the entity. Next, it must be determined whether a sufficient separation exists between the magnetic field vector of the measurement and a direction of a geomagnetic dipole according to a dipole characterization of the geomagnetic field, to insure convergence of a correction scheme applied to a position solution, wherein the dipole characterization is a first order of a series of nth order spherical harmonics representing the geomagnetic field as a gradient of a scalar potential function. Upon a determination of non-existence of the sufficient separation, the previous steps are repeatedly performed until a sufficient separation exists between the magnetic field vector and direction of the dipole. Once the sufficient separation exists, the next step is calculating an inverted dipole solution comprising two position solutions approximately 180 degrees apart, each position solution comprising a position vector for the entity and an entity distance from the center of the earth, for the measurement of three axes magnetic field data. The last step is selecting a true position from the two position solutions based upon the hemisphere location stored in memory.

Another object of the invention is to provide a successive substitutions method having a stopping criteria of convergence within a number of iterations being followed by applying a Newton-Raphson method for a second number of iterations as a correction scheme.

Further scope of applicability of the present invention will become apparent from the detailed description given hereinafter. However, it should be understood that the detailed description, while indicating preferred embodiments of the invention, is given by way of illustration only, since various changes and modifications within the spirit and scope of the invention will become apparent to those skilled in the art from this detailed description. Furthermore, all the mathematical expressions are used as a short hand to express the inventive ideas clearly and are not limitative of the claimed invention. See Appendix B for a list of Nomenclature used in the mathematical expressions.

BRIEF DESCRIPTION OF THE DRAWINGS

These and other features, aspects, and advantages of the present invention will become better understood with regard to the following detailed description and accompanying drawings which are given by way of illustration only, and thus are not linmitative of the present invention, and wherein.

DETAILED DESCRIPTION

Figure 1A:
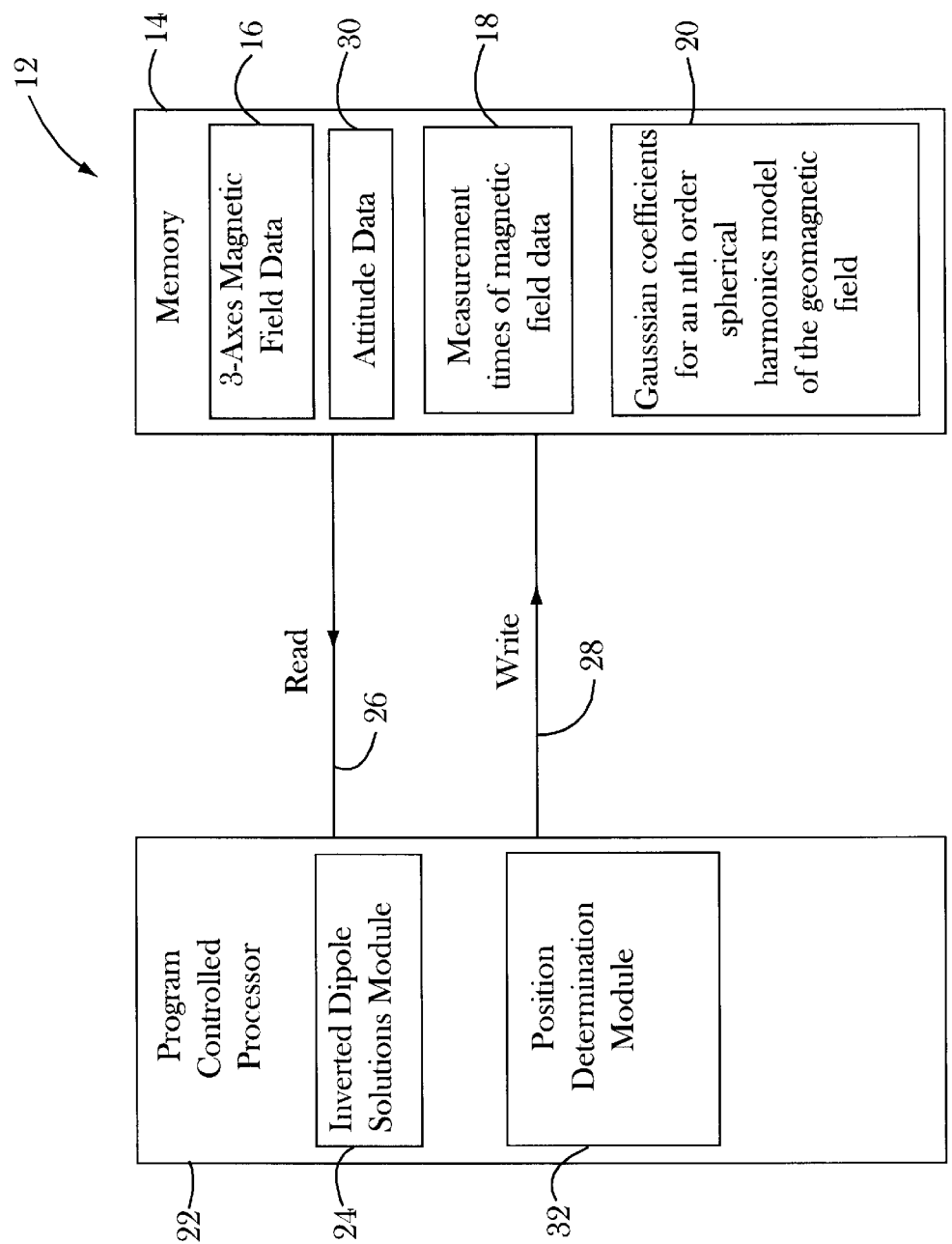
FIG. 1A shows an embodiment of a computer-implemented apparatus for autonomous position determination of a vehicle.

FIG. 1A shows an embodiment of an apparatus for autonomous position determination of a vehicle. The apparatus (12) consists of a program controlled processor (22) and a memory (14) storing the data needed by and generated by the software program embedded in the processor for determining the position of a vehicle from magnetic field data. The processor has an Inverted Dipole Solutions Module (24) and a Position Determination Module (32), which are embodied in software. The memory (14) stores three axes magnetic field data (16), attitude data (30), measurement times of magnetic field data (18), and Gaussian coefficients for an nth order spherical harmonics model of the geomagnetic field.

Figure 1B:
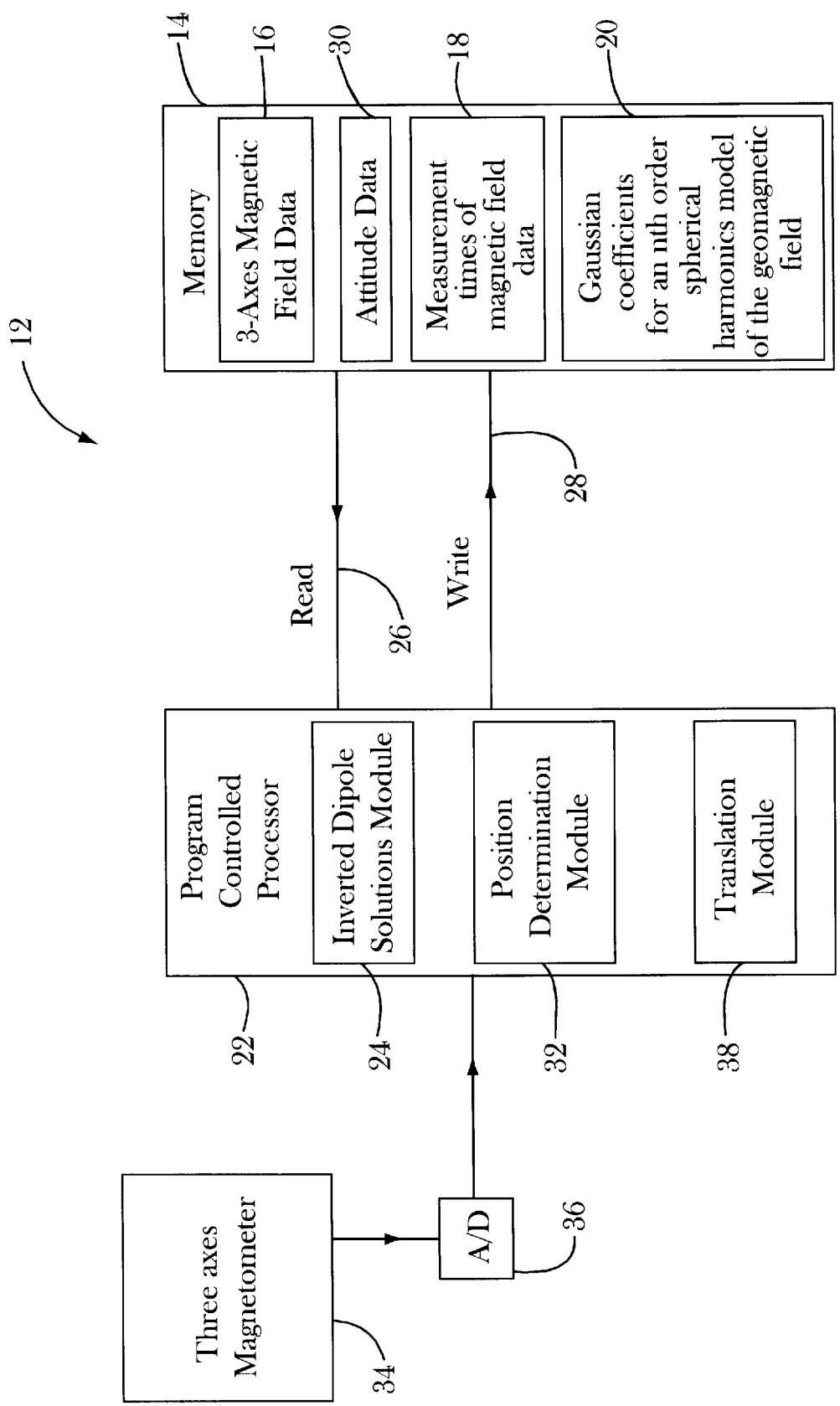
FIG. 1B shows an alternate embodiment of a computer-implemented apparatus for autonomous position determination of a vehicle.

FIG. 1B is a preferred embodiment of the invention in which the magnetic field data (16) is measured by a three axes magnetometer (34). An analog to digital converter (36) converts the magnetometer measurements to a computer readable form. A translation module (38) in the program controlled processor translates the magnetometer data from body coordinates to geocentric inertial coordinates using the attitude data. FIG. 2 shows a computer implemented method for obtaining inverted dipole solutions, each of which comprises two position solutions 180 degrees apart. The method steps may be easily coded into a software program. Before describing the steps of the method, a discussion of their development follows to understand how the method works.

As stated in the Summary, the magnetic field of the Earth can be represented by the gradient of a scalar potential function. The function can therefore be modeled by a series of $k^{th}$ order spherical harmonics:

$$v(r, \theta, \phi) = a \sum_{n=1}^{k} \left(\frac{a}{r}\right)^{n+1} \sum_{m=0}^{n} (g_n^m \cos m\phi + h_n^m \sin m\phi) P_n^m(\theta) \quad (1)$$

Where a is the equatorial radius of the earth, r, $\theta$, and $\phi$ are the geocentric, co-elevation, and longitude from Greenwich for any point in space. From this model, the magnetic field vector at a position may be defined in terms of the position. An nth order field model that may be used is the 10th order model incorporating the 1990 International Geomagnetic Reference Field Gaussian coefficients, $g_n^m$ and $h_n^m$. The Lengendre functions, $P_m^n$, are assumed Schmidt normalized (see Plett, M., "Magnetic Field Models" *Spacecraft Attitude and Control*, J. R. Wertz (editor), Kluwer Academic Publishers, Dordrecht, The Netherlands, 1978, pp. 779–786, and Chapman, S, and Bartels, J., *Geomagnetism*, Oxford England, Clarendon Press, 1940) such that the $P_n^m$ satisfy:

$$\int_0^\pi [P_n^m(\theta)]^2 \sin(\theta) d\theta = \frac{2(2 - \delta_m^0)}{2m + 1} \quad (2)$$

where $\delta$ is the Kronecker delta. Further, the Gaussian normalized Legendre functions, $P^{n,m}$, are related to the Schmidt normalized Legendre functions by:

$$P_n^m = S_{n,m} P^{n,m} \quad (3)$$

where $$S_{n,m} = \left[\frac{(1 - \delta_m^0)(n - m)!}{(n + m)!}\right]^{1/2} \frac{(2n - 1)!!}{(n - m)!} \quad (4)$$

where $(2n-1)!! \equiv 1 \cdot 3 \cdot 5 \ldots (2n-1)$. Plett points out that these factors, $S_{n,m}$, are best combined with the Gaussian coefficients since they are independent of r, $\phi$, and $\theta$ and therefore need only be computed once. Therefore the following relationships can be defined:

$$g^{n,m} = S_{n,m} g_n^m \quad (5)$$

$$h^{n,m} = S_{n,m} h_n^m \quad (6)$$

In order to compute these functions, the following recursive relationships are useful (see Plett):

$$S_{0,0} = 1 \quad (7)$$

$$S_{n,0} = S_{n-1,0}\left[\frac{2n - 1}{n}\right] \quad n \geq 1 \quad (8)$$

$$S_{n,m} = S_{n,m-1}\sqrt{\frac{(n - m + 1)(\delta_m^1 + 1)}{n + m}} \quad m \geq 1 \quad (9)$$

and

-continued $$P^{0,0} = 1 \quad (10)$$

$$P^{n,n} = \sin(\theta) P^{n-1,n-1} \quad (11)$$

$$P^{n,m} = \cos(\theta) P^{n-1,m} - K^{n,m} P^{n-2,m} \quad (12)$$

where $$K^{n,m} = \frac{(n - 1)^2 - m^2}{(2n - 1)(2n - 3)} \quad n > 1 \quad (13)$$

$$K^{n,m} = 0 \quad n = 1 \quad (14)$$

Therefore, given a position in geocentric coordinates, it is possible to compute the magnetic field vector at that position (see Plett):

$$B_r = \frac{-\partial V}{\partial r} = \sum_{n=1}^{k} \left(\frac{a}{r}\right)^{n+2} (n + 1) \sum_{m=0}^{n} (g^{n,m} \cos m\phi + h^{n,m} \sin m\phi) P^{n,m}(\theta) \quad (15)$$

$$B_\theta = \frac{-1}{r} \frac{\partial V}{\partial \theta} = -\sum_{n=1}^{k} \left(\frac{a}{r}\right)^{n+2} \sum_{m=0}^{n} (g^{n,m} \cos m\phi + h^{n,m} \sin m\phi) \frac{\partial P^{n,m}}{\partial \theta} \quad (16)$$

$$B_\phi = \quad (17)$$

$$\frac{-1}{r \sin\theta} \frac{\partial V}{\partial \phi} = \frac{-1}{\sin\theta} \sum_{n=1}^{k} \left(\frac{a}{r}\right)^{n+2} \sum_{m=0}^{n} (g^{n,m} \cos m\phi + h^{n,m} \sin m\phi) P^{n,m}(\theta)$$

or in geocentric inertial coordinates:

$$B_x = (B_r \cos\delta + B_\theta \sin\delta)\cos\alpha - B_\phi \sin\alpha \quad (18)$$

$$B_y = (B_r \cos\delta + B_\theta \sin\delta)\sin\alpha + B_\phi \cos\alpha \quad (19)$$

$$B_z = (B_r \sin\delta - B_\theta \cos\delta)\cos\alpha \quad (20)$$

Where $\delta$ is the declination and $\alpha$ is the right ascension of the vehicle, where the right ascension is the sum of the longitude and the right ascension of the Greenwich meridian.

These equations may be inverted so that, given a measurement of the magnetic field in inertial space, a position can be found. To get a coarse estimate of the position, the dipole model for the earth's magnetic field was considered. The dipole characterization of the earth's magnetic field in geocentric inertial coordinates is:

$$B_x = \frac{a^3 H_0}{r^3}\left[3(\hat{m} \cdot \hat{R})R_x - \sin\theta_m \cos\alpha_m\right] \quad (21)$$

$$B_y = \frac{a^3 H_0}{r^3}\left[3(\hat{m} \cdot \hat{R})R_y - \sin\theta_m \sin\alpha_m\right] \quad (22)$$

$$B_z = \frac{a^3 H_0}{r^3}\left[3(\hat{m} \cdot \hat{R})R_z - \sin\theta_m \cos\theta_m\right] \quad (23)$$

where:

$$\hat{m} = \begin{bmatrix} \sin\theta_m \cos\alpha_m \\ \sin\theta_m \sin\alpha_m \\ \cos\theta_m \end{bmatrix} \quad (24)$$

$$\alpha_m = \alpha_{G0} + \frac{d\alpha_G}{dt}(t - t_0) + \phi_m \quad (25)$$

$$\hat{m} \cdot \hat{R} = R_x \sin\theta_m \cos\alpha_m + R_y \sin\theta_m \sin\alpha_m + R_z \cos\theta_m \quad (26)$$

-continued $$a^3 H_0 = a^3 \left[ g_1^{0^2} + g_1^{1^2} + h_1^{1^2} \right]^{1/2} = \text{the total dipole strength} \quad (27)$$

Where $R_{x,y,z}$ are the unit directions of the vehicle position, r is the vehicle distance from the center of the earth, $\hat{R}$ is the unit direction of the vehicle, $\alpha_{G0}$ is the right ascension of the Greenwich meridian at the time from which t is measured, $$\frac{d\alpha_G}{dt}$$

is the average rotation rate of the earth (360.9856469 deg/day), and $\phi_m$, $\theta_m$ are the east longitude and co-elevation of the dipole, and $\alpha_m$ is the right ascension of the dipolw. The therefore $\hat{m}$ represents the direction cosine of the dipole.

Given $\vec{B}$ and the location of the dipole at the desired time, the quadratic equations (21–27) can be solved for the direction cosines:

$$\hat{R} = \pm \frac{\frac{2|\vec{B}|\hat{m}}{(\hat{m}\cdot\vec{B})+\sqrt{D}} + \vec{B}}{\left( \frac{6|\vec{B}|^2}{(\hat{m}\cdot\vec{B})+\sqrt{D}} \left( \frac{6|\vec{B}|^2}{(\hat{m}\cdot\vec{B})+\sqrt{D}} + \hat{m}\cdot\vec{B} \right) \right)^{\frac{1}{2}}} \quad (28)$$

and the vehicle distance from the center of the earth, r:

$$r^3 = \frac{a^3 H_0}{s(\vec{B}\cdot\vec{B})} (\hat{m}\cdot\vec{B}+\sqrt{D}) \quad (29)$$

where:

$$D = (\hat{m}\cdot\vec{B})^2 + 8|\vec{B}|^2 \quad (30)$$

Even though equation (29) is 3rd order, only a single real non-negative solution exists.

These expressions (28–30) form the "inverted dipole" solutions. The ± in the expression for the direction cosine solution in expression 28 implies that there are 2 position vector solutions to these equations 180° apart. Further information is used to determine the correct solution. Furthermore, a singularity exists mathematically when the magnetic field vector is 180° from $\hat{m}$, the direction of the magnetic dipole.

These inverted dipole solutions can be in error by more than 1000 km if the true position is near the magnetic equator and 100 km elsewhere. This error is due to the fact that the higher order components have a large effect near the equator. The dipole model is first order so that the higher order terms have been neglected thus far. As a consequence of the contribution of the higher order terms, particularly near the magnetic equator, a correction scheme to the inverted dipole solution was developed.

Figure 2A:
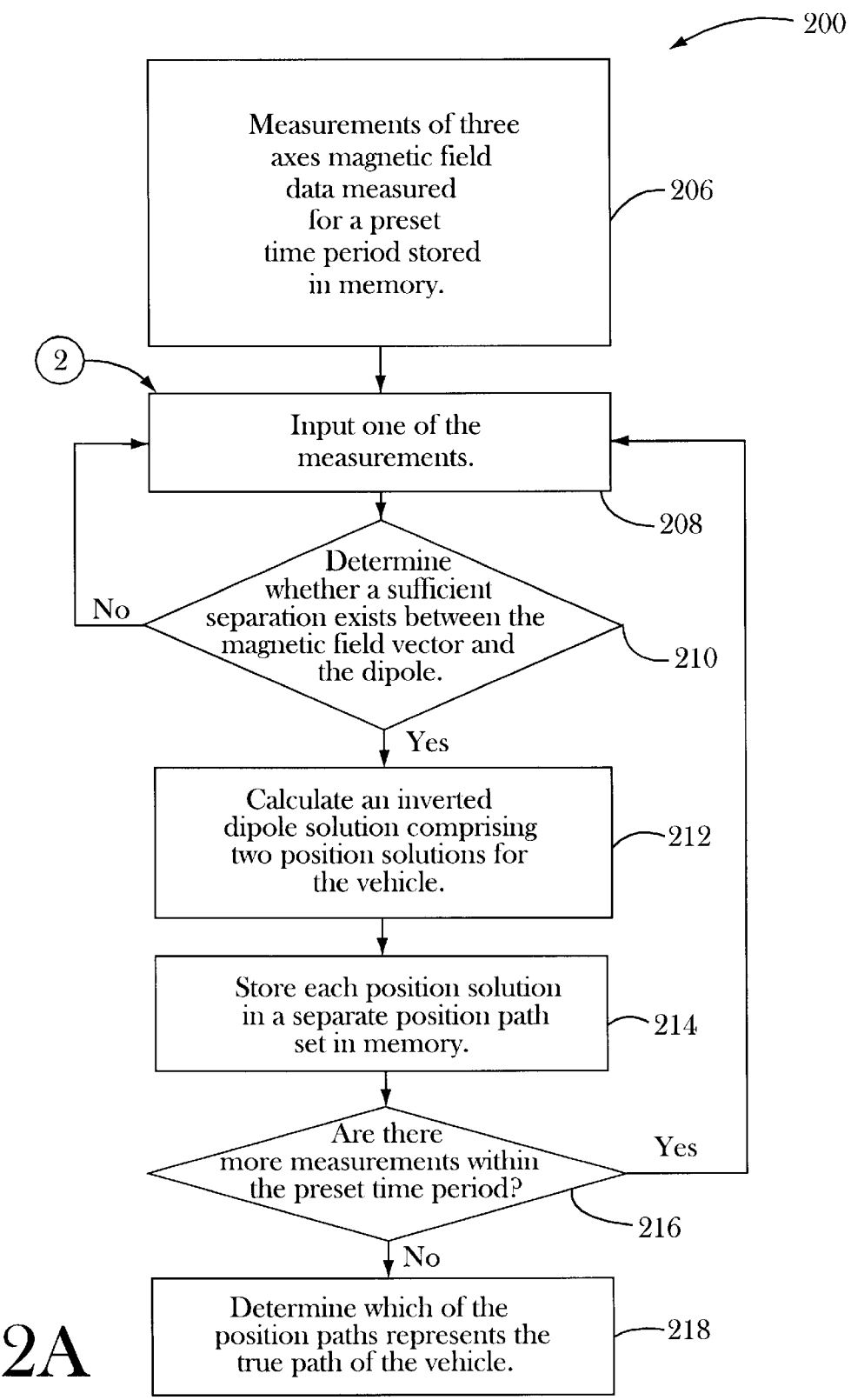
FIG. 2A shows a flowchart of a computer-implemented method for autonomous position determination of a vehicle.

FIG. 2A shows a flowchart of the steps to be performed by an embodiment of the computer-implemented method for autonomous position determination (200). A processor inputs (208) measurements (206) of the three axes magnetic field data in geocentric inertial coordinates. These measurements are no older than the beginning of a preset time period. The preset time period is discussed below in the discussion on velocity vectors. Next a determination (210) as to whether a sufficient separation exists between the magnetic field vector and the dipole is made. If a sufficient separation exists, the processor calculates an inverted dipole solution for the measurement (212).

Figure 2B:
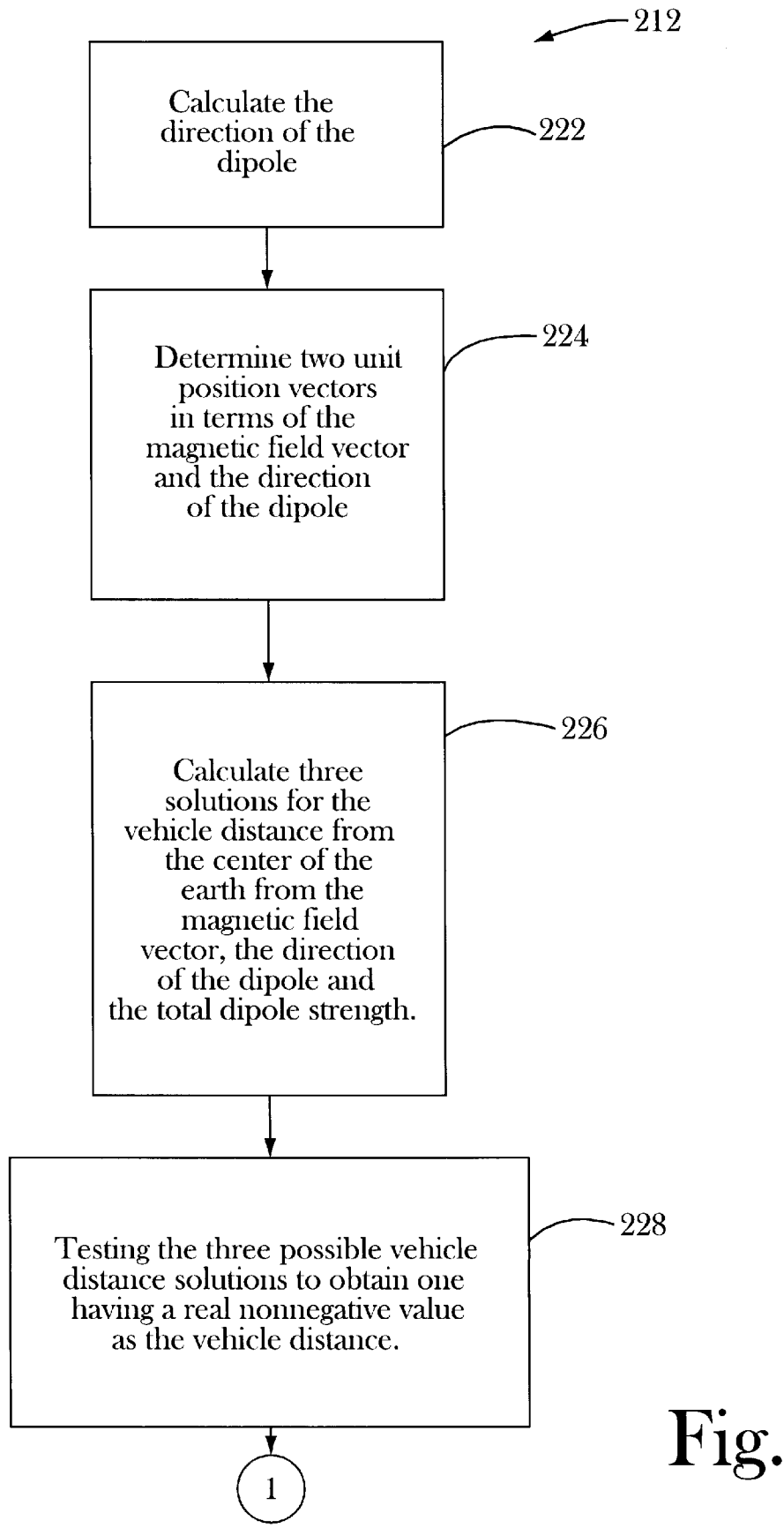
FIGS. 2B and 2C shows a flowchart of a computer-implemented method for calculating inverted dipole solutions.
Figure 2C:
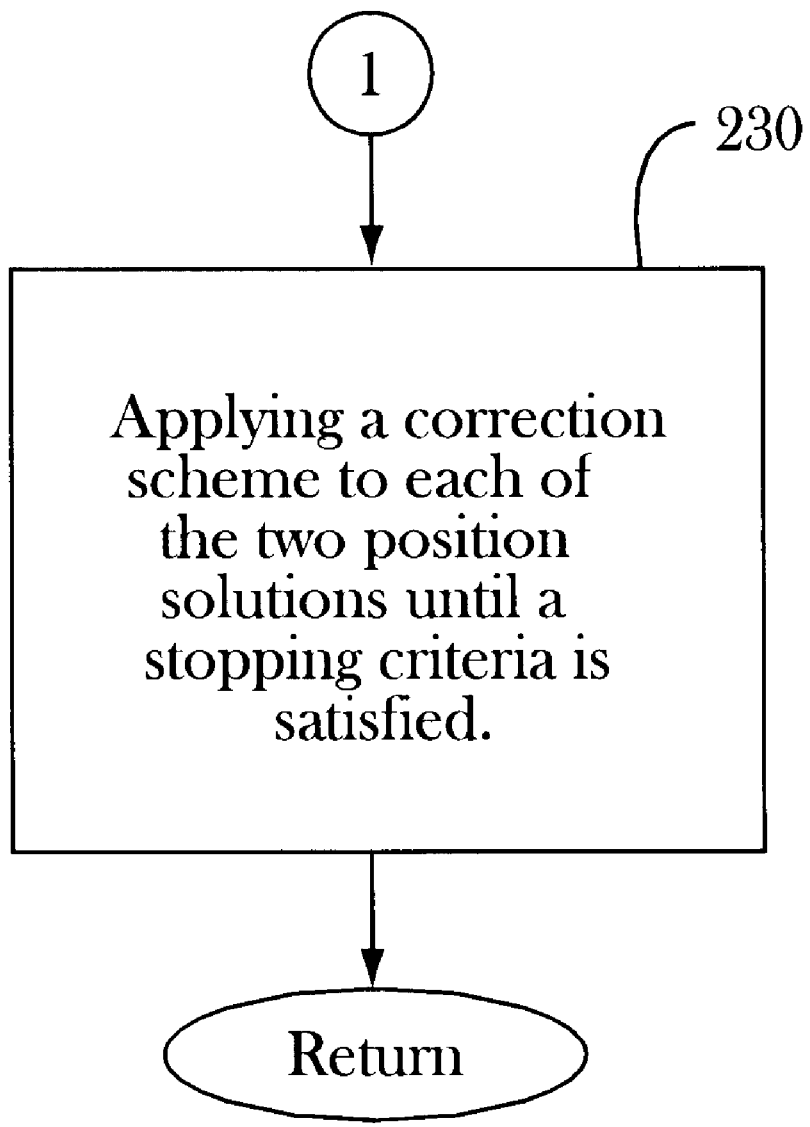

FIGS. 2B and 2C outline steps that a program controlled processor performs to calculate the inverted dipole solution. The direction of the dipole $\hat{m}$ is calculated (222). Next two unit position vectors are determined from the magnetic field vector of the measurement and $\hat{m}$ (224). Equations 28 and 30 may be embedded in software instructions to determine these unit position vectors, which will be used by the vehicle to determine its position. Next, three possible solutions for the vehicle distance from the center of the earth are calculated by the processor (226). Equation 29 may be programmed in software to calculate three possible solutions for the vehicle distance from the center of the earth. The total dipole strength may be treated as a constant term with value 7.84e+015 Wb m, although the dipole strength has decreased by about 1.28% from 1975 to 1990. Next, the three solutions are tested to see which represents a real physical distance by determining which of the three solutions has a real nonnegative value (228). Each unit position vector and the vehicle distance represent a possible position solution, so that the inverted dipole has two position solutions. For the reasons given above, a correction scheme is applied to each position solution until a stopping criteria is satisfied (230).

Both a successive substitutions method and a successive substitutions method in combination with a Newton-Raphson method are used in embodiments of the invention. The preferred embodiment of FIG. 3 processes each inverted dipole solution through a stopping criteria of twenty iterations for the successive substitutions method and five iterations for the Newton-Raphson method. The Newton-Raphson method is known for its quadratic convergence properties but is not robust to poor initial estimates. Alternatively, successive substitutions is known for robustness to errors in initial estimates, but has linear convergence properties (see Battin, R. A., *An Introduction to the Mathematics of Methods of Astrodynamics*, New York, American Institute of Aeronautics and Astronautics, Inc., 1987, pp. 192–217).

Successive substitutions is an iterative solution. The magnetic field vector is divided into the dipole component and higher order terms (HOTs), or:

$$\vec{B}_1 = \text{DIPOLE} + \text{HOT} \quad (31)$$

and consequently, $$\text{HOT} = \vec{B}_1 - \text{DIPOLE} \quad (32)$$

Where:

$$\vec{B}_1 = \overline{A}\vec{B}_{BCS} \quad (33)$$

and $\vec{B}_{BCS}$ is the magnetic field vector measured in body coordinates and $\overline{A}$ is the direction cosine matrix of the attitude data which transforms from body coordinates to inertial space. The quantity $\vec{B}_1$ is measured. Onboard a spacecraft, for instance, the attitude direction cosine matrix, $\overline{A}$, is determined using measurements from a star tracker, sun sensor or other sensor whose measurements may be used to determine attitude. The present invention only requires attitude data as an input and is not dependent on the source from which is was obtained. The magnetic field vector is measured by a three axis magnetometer.

The dipole inversion logic above yields the new operator, $\text{DIPOLE}^{-1}(\vec{B})$, which can be used iteratively to improve $\vec{R}$:

$$\vec{R}_{k+1} = \text{DIPOLE}^{-1}(\vec{B}_1 - \text{HOT}(\vec{R}_k)) = F(\vec{R}_k) \quad (34)$$

To get the $\text{HOT}(\vec{R}_k)$, the $\vec{R}_k$ estimate is used to compute both the nth order field and the dipole field in equation (32). In a preferred embodiment of the invention, the nth order model is the 1990 10th order model.

In order to examine the convergence behavior of this iterative scheme, $\vec{R}$ is rotated into magnetic coordinates so that $\hat{m}$ is now $\hat{e}_3$ and:

$$\vec{R}_i(\tilde{\vec{B}}) = \left(\frac{a^3 H_0}{2}\right)^{\frac{1}{3}} \left( \frac{\tilde{B}_i |\tilde{B}|^{-\frac{5}{3}} \left( \sqrt{\frac{\tilde{B}_z^2}{2} + 8|\tilde{B}|^2} + \tilde{B}_z \right)^{\frac{4}{3}}}{\left( 12|\tilde{B}|^2 + 6\tilde{B}_z \left( \sqrt{\frac{\tilde{B}_z^2}{2} + 8|\tilde{B}|^2} + \tilde{B}_z \right) \right)^{\frac{1}{2}}} \right) \quad i = x, y \quad (35)$$

$$\vec{R}_z(\tilde{\vec{B}}) = \left(\frac{a^3 H_0}{2}\right)^{\frac{1}{3}} |\tilde{B}|^{-\frac{5}{3}} \left( \sqrt{\frac{\tilde{B}_z^2}{2} + 8|\tilde{B}|^2} + \tilde{B}_z \right)^{\frac{4}{3}}$$

$$\left( \frac{1}{3}|\tilde{B}|^2 + \frac{1}{6}\tilde{B}_z \left( \sqrt{\frac{\tilde{B}_z^2}{2} + 8|\tilde{B}|^2} + \tilde{B}_z \right) \right)^{\frac{1}{2}} \quad (36)$$

where $\tilde{B}$ is the measured magnetic field vector in inertial space minus the computed higher order terms.

Clearly, equation (36) shows that a singularity exists when $\hat{B}_z = -1$. The following analysis will provide insight into how close to $-1$ $\hat{B}_z$ can be and still have guaranteed convergence for the successive substitutions scheme. A sufficient condition for successive substitutions of a system of n non-linear equations to converge is that the absolute value of each of the partial derivatives of F(R) in equation (34) with respect to each variable is less than 1/n, where n is the number of variables. (Carnahan, B., Luther H. A., and Wilkes, J. O., *Applied Numerical Methods*, New York, 1969.) In the case where n=3, results from these calculations show that the sufficient condition for successive substitutions convergence is met if the measured unit magnetic field z direction in magnetic coordinates is greater than $-0.978$, or 12° from the magnetic dipole direction. Near the magnetic equator, the magnetic field direction changes at a rate of approximately 2.90°/° latitude. Therefore, the dipole changes 24° with a change of approximately 8° in latitude. In sum, $\vec{R}_x$ and $\vec{R}_y$ both have singularities as $\hat{B}_z$ approached $-1$. However, as long as $\hat{B}_z$ is greater than $-0.979$, or 12° from the magnetic dipole, successive substitutions will converge on a position solution.

The Newton-Raphson corrector, while more sensitive to poor initial conditions than successive substitutions, generally converges more rapidly (see Battin). The analytical partial derivatives required for the method can be computed in a straight forward way.

For the Newton method, the function that must go to zero is defined as:

$$F(\vec{R}) = \vec{B}_1 \text{ modeled}(\vec{R}) - \vec{B}_1 \quad (37)$$

Again, $\vec{B}_1$ is measured. Then the Newton iterative scheme is:

$$\vec{R}_{k+1} = \vec{R}_k - J^{-1} F(\vec{R}_k) \quad (38)$$

where J is the 3×3 Jacobian, $$\frac{\partial \vec{B}}{\partial \vec{R}},$$

which can be derived analytically (see Appendix C).

The Jacobian has properties which are useful from a computation aspect. The matrix is symmetric and the matrix has zero trace. Therefore, only five elements need to be computed to construct the Jacobian.

While the successive substitutions requires the derivative of the function to be less than 1/n to guarantee convergence for a system of n equations, the Newton-Raphson method simply requires the measured magnetic field vector be sufficiently separated from the dipole direction to allow for measurement uncertainty. Therefore, if the sufficient condition for the successive substitutions is met, the Newton-Raphson method's requirement that the measured magnetic field vector be sufficiently separated from the dipole is met.

Near the magnetic equator, the field is at a minimum. In low earth orbit, the field minimum is approximately 225 mgauss. If measurement uncertainty is 0.7 mgauss per axis in the magnetometer, or 1.2 mgauss RSS, the field vector must be greater than atan(1.2/225) or 0.3° from the negative dipole direction. Further, there is approximately a one degree error in the spherical harmonic model at any given point, due to non core magnetic activities. Therefore, the measured magnetic field direction must be at least 1.3° from the negative dipole direction. Evaluating the Jacobian in Appendix C at the magnetic dipole equator for a 1° change in the spacecraft latitude yields a maximum 3.9° change in the magnetic field.

The relationship between the error in the measurement of the magnetic field, $\Delta \vec{B}_{BCSmeasured}$, as well as the error in the spacecraft attitude, $\Delta A$, to the resulting error in the position solution is developed as follows:

$$0 = F(\vec{R} + \Delta\vec{R}) = \vec{B}_{1\,modeled} - (\overline{A} + \Delta\overline{A}) \vec{B}_{BCSmeasured} - (\overline{A} + \overline{A}) \Delta$$
$$\vec{B}_{BCSmeasured} - \text{HOT} \quad (39)$$

or, neglecting the higher order terms:

$$\vec{B}_{1\,modeled} + J\Delta\vec{R} \approx (\overline{A} + \Delta\overline{A}) \vec{B}_{BCSmeasured} + (\overline{A} + \Delta\overline{A}) \Delta \vec{B}_{BCSmeasured} \quad (40)$$

which reduces to:

$$\Delta \vec{R} \approx J^{-1}(\Delta\overline{A}\,\vec{B}_{BCSmeasured} + \overline{A}^{**} \Delta \vec{B}_{BCSmeasured}) \quad (41)$$

Therefore, the errors in R are directly proportional to $J^{-1}$. When the gradient in the field is small, the error is large. So, the position error is less effected by measurement errors at higher latitudes. Assuming the error in attitude is not significant (i.e. is less than 100 arcsecs RSS for a single star tracker scenario), $$\Delta R = J^{-1}(A\Delta B) \quad (42)$$

Let $\lambda_{min}$ be the minimum absolute valued eigenvalue of J. Then a singularity occurs in the limit as $\lambda_{min}$ goes to zero, where J becomes non-singular. A more easily computed indicator that J is becoming non-singular is the determinant of J approaching zero. The matrix J can be decomposed as follows:

$$J = M^{-1} D M \quad (43)$$

where D is a diagonal matrix in which the eigenvalues of J are on the diagonal, and the columns of M are the eigenvectors of J. Substituting equation (43) into equation (42) and multiplying both sides by M yields:

$$M\Delta R = D^{-1} M(\overline{A}\Delta B) \quad (44)$$

Multiplying together the elements of the vectors on each side of equation (44) yields:

$$(\Delta R_1 \cdot \Delta R_2 \cdot \Delta R_3) = (\Delta B_1 \cdot \Delta B_2 \cdot \Delta B_3)/|J| \quad (45)$$

where $R_i$ and $B_i$ are simply transformed into the eigenspace. For example, to assure that the position solutions have errors less than say 125 km in each direction, and if the measurement uncertainty is 6 mgauss in each direction, then the determinant of J must be >0.0001. Further, equation (42) represents a worst case bound on the error since the higher order terms were neglected.

After the inverted dipole solution has been calculated and corrected (212), each position solution is stored in a separate data set in memory (214) so that, once it is determined that there are no more measurements for the preset time period (216), two position paths are stored in memory. Of these two position paths, the true position path of the vehicle must be determined in order for the vehicle to know where it is (218) so that it can act appropriately.

Figure 1C:
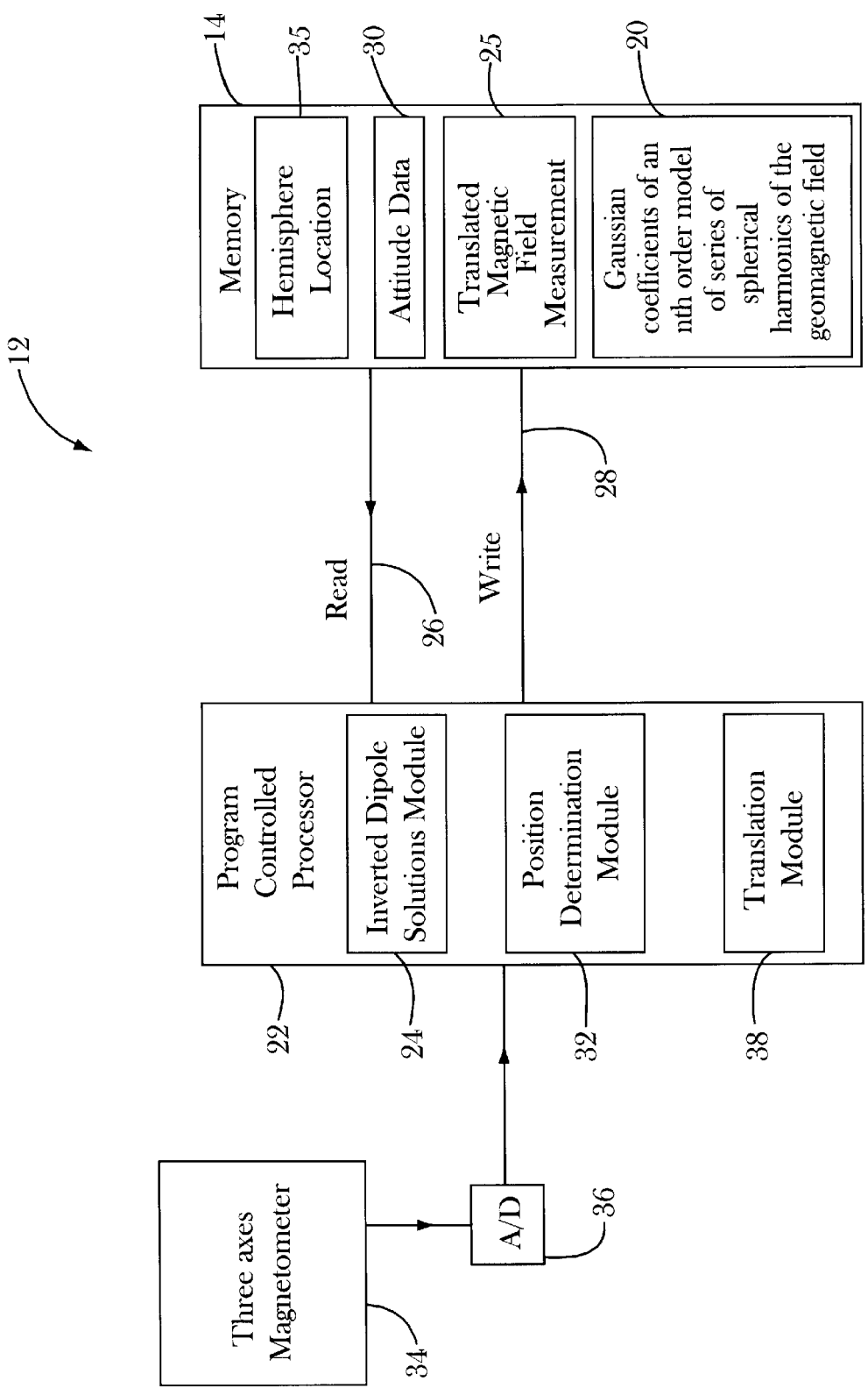
FIG. 1C shows an embodiment of a computer-implemented apparatus for autonomous position determination of a terrestrial entity.
Figure 4:
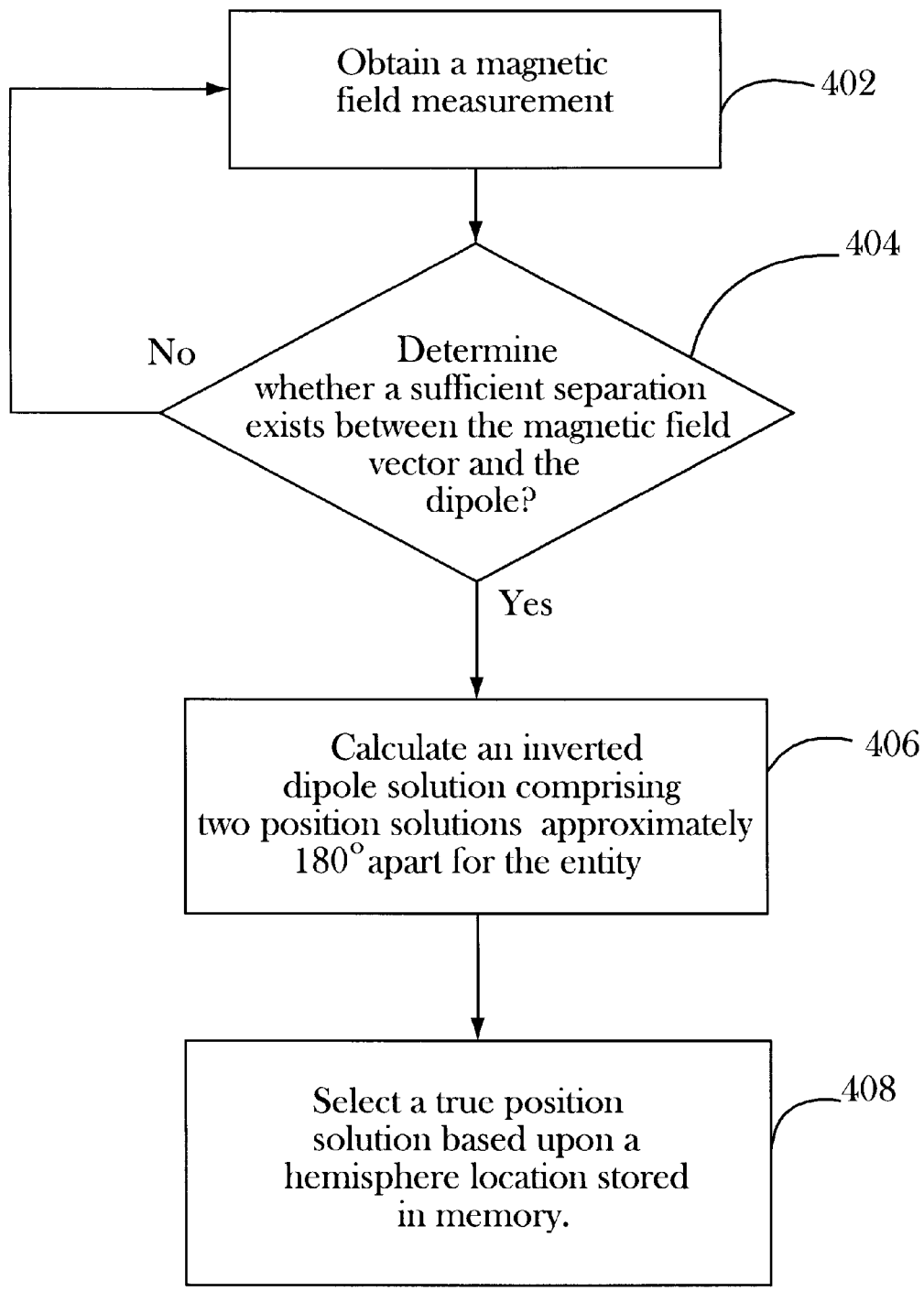
FIG. 4 shows an embodiment of a computer-implemented method for autonomous position determination of a terrestrial entity.

For terrestial entities including living and nonliving things, with knowledge of which hemisphere the entity is located, one of the position solutions from the inverted dipole solution can be selected as the true position on one measurement. FIG. 1C shows a computer-implemented apparatus for autonomous position determination of a terrestrial entity. The memory (14) comprises the hemisphere location (35) as well as Attitude Data (30), the Gaussian coefficients (20) and a translated magnetic field measurement (25). FIG. 4 shows the flowchart of a computer-implemented method for autonomously determining the position of a terrestial entity. Step (402) is obtaining a magnetic field measurement. Step (404) is determining whether a sufficient separation exists between the magnetic field vector of the measurement and a direction of a geomagnetic dipole according to a dipole characterization of the geomagnetic field, to insure convergence of a correction scheme to an inverted dipole position solution, wherein the dipole characterization is a first order of a series of nth order spherical harmonics representing the geomagnetic field as a gradient of a scalar potential function. Step (406) calculates an inverted dipole solution which combined with the hemisphere location in Step (408) allows selection of the true position.

In order to determine the true path, one method takes advantage of the fact that the magnetic field is not symmetrical about its equator so that the incorrect or ambiguous position path will not follow the same Keplerian orbit that the true path does. Further, it is assumed to be unlikely that the ambiguous solution will follow a Keplerian orbit at all. The total energy of an orbit can be computed using just the magnitude of the position and velocity vectors as follows:

$$TE = \frac{1}{2}v^2 - \frac{\mu}{r} \quad (46)$$

where v is the magnitude of the velocity, r is the magnitude of the position vector, and $\mu$ is the earth's gravitational constant. The difference of the total energy at time t and time t+n minutes, $\Delta TE$, should be equal to zero plus some noise due to the measurement errors. Therefore, to break the ambiguity the solution with the smaller abs($\Delta TE$) should be chosen. However, further quantification is required for the cases where either both abs($\Delta TE$) solutions are large or both close to zero.

Figure 2D:
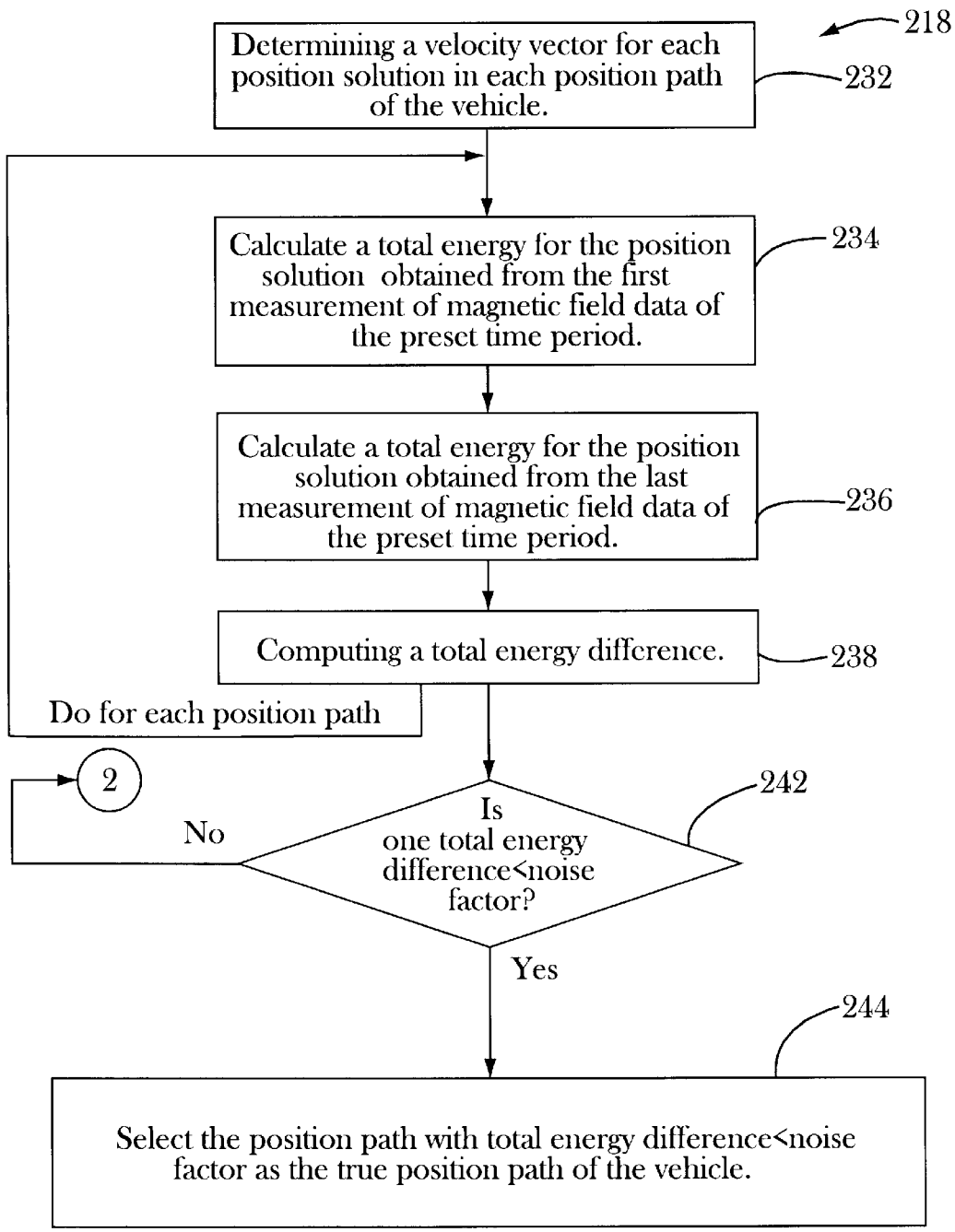
FIG. 2D shows a flowchart of a computer-implemented method for determining which of the position paths represents the true path of the vehicle.

In order to calculate a total energy, velocity vectors are required. In FIG. 2D, a velocity vector for each position solution in each of the two position paths is determined (232). For a spacecraft, one way to calculate velocity vectors is by using the Taylor series expansion of the equations of motion, the velocity can be computed from at least two position vectors.

Battin describes a method for propagating an orbit from an initial position and velocity vector. Since the equations of motion for the two body problem generally do not have a closed form analytic solution, the Taylor series expansion is considered. The position of a body can be expressed as:

$$\vec{R}(t) = F(t)\vec{R}_0 + G(t)\vec{V}_0 \quad (47)$$

where the coefficients F(t) and G(t) can be represented as a power series in $(t-t_0)$. The coefficients each satisfy the differential equations:

$$\frac{d^2 F(t)}{dt^2} + \varepsilon F(t) = 0 \quad (48)$$

$$\frac{d^2 G(t)}{dt^2} + \varepsilon G(t) = 0 \quad (49)$$

Along with the initial conditions that $F(t0)=1$, $G(t0)=0$, $$\left.\frac{dF}{dt}\right|_{t_0} = 0, \text{ and } \left.\frac{dG}{dt}\right|_{t_0} = 0,$$

yields:

$$F(t) = \sum_{n=0}^{\infty} F_n (t-t_0)^n \quad (50)$$

$$G(t) = \sum_{n=0}^{\infty} G_n (t-t_0)^n \quad (51)$$

These coefficients are given by:

$$F_0 = 1 \quad F_1 = 0 \quad F_2 = -\varepsilon_0 \quad F_3 = \_\varepsilon_0 \lambda_0$$

$$F_4 = -5/8\varepsilon_0 \lambda_0^2 + 1/8\varepsilon_0 \psi_0 - 1/12\varepsilon_0^2 \text{ etc.}$$

$$G_0 = 0 \quad G_1 = 1 \quad G_2 = 0 \quad G_3 = -1/6\varepsilon_0 \quad G_4 = -1/4\varepsilon_0 \lambda_0 \text{ etc.}$$

where $\epsilon$, $\lambda$, and $\psi$ are the Legrange fundamental invariants:

$$\varepsilon = \frac{\mu}{r^3} \quad (52)$$

$$\lambda = \frac{\vec{R} \cdot \vec{V}}{r^2} \quad (53)$$

$$\psi = \frac{\vec{V} \cdot \vec{V}}{r^2} \quad (54)$$

For this application, spacecraft position vectors can be directly computed using the method described above, but there is no independent measure of velocity. An estimate of the spacecraft velocity can be computed in a two step process. First, equation (47) can be solved for $\vec{V}_0$ given at least two position fixes and an initial estimate of $V_0$ to compute the approximate F and G series. Further, with more than 2 position fixes, a least squares fit can provide improved velocity vectors:

$$\vec{V}_0 = (\vec{R}(t) - \vec{F}(t)\vec{R}_0)/\vec{G}(t) \tag{55}$$

Figure 3:
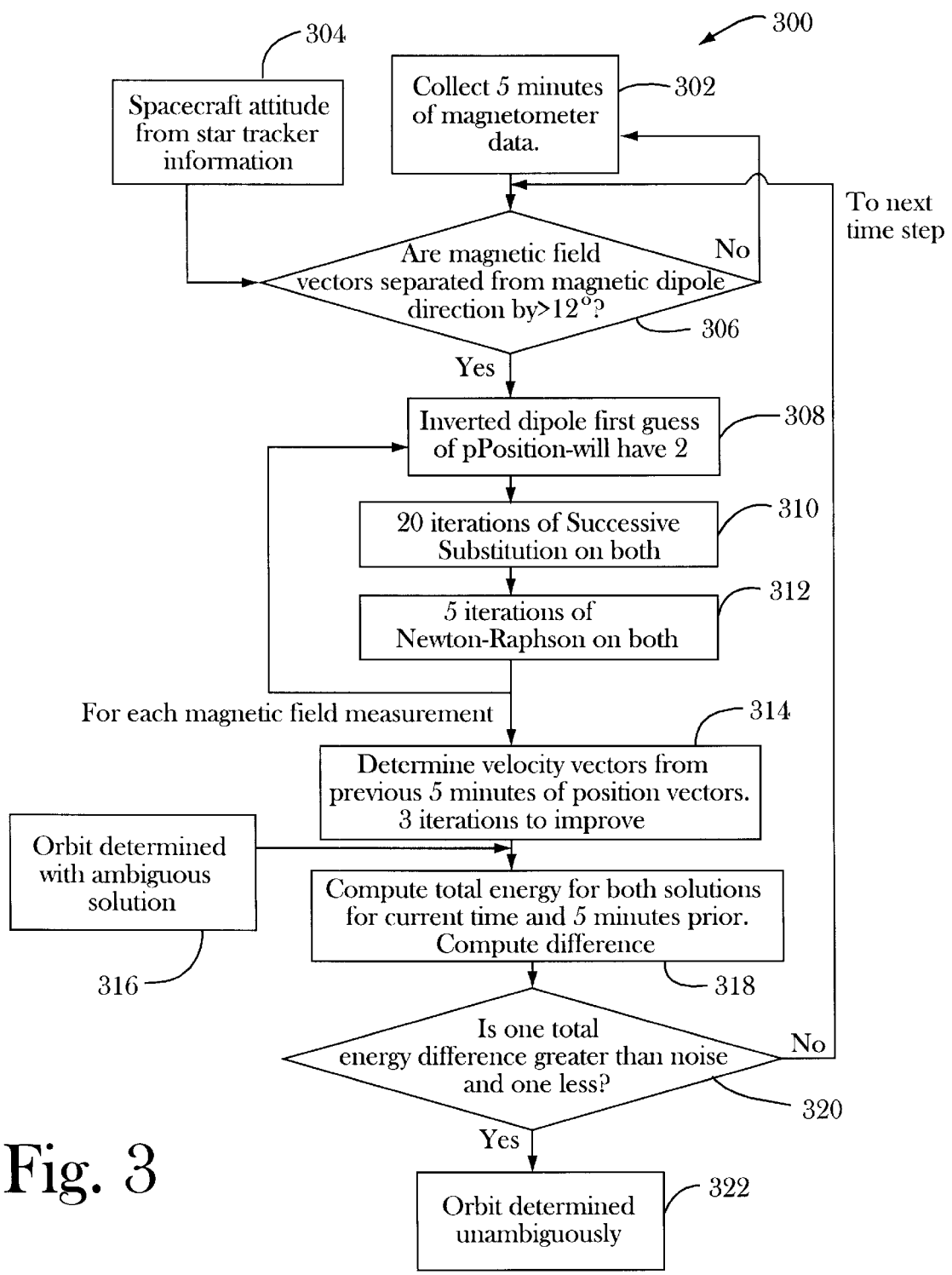
FIG. 3 shows a preferred embodiment of a computer-implemented method for autonomous position determination of a vehicle.

In the particular embodiment of FIG. 3 using the equations of (47) through (55) in embedded software in the processor, the F and G series are intentionally at $3^{rd}$ order to eliminate R and consequently minimize the occurrence of $\vec{V}$ on the right hand side of equation (55). Also note that in equation (55), the coefficients $\vec{F}(t)$ and $\vec{G}(t)$ are actually n×1 matrices where n is the number of $\vec{R}$'s used to solve for $\vec{V}_0$. The vector divide in equation (55) is more precisely defined as multiplying by the pseudo inverse of $\vec{G}(t)$. This becomes a least squares solution to the system of 3×n equations with 3 unknowns. The second step is to include more powers of $(t-t_0)$ by iteratively using the computed $\vec{V}_0$ to determine new Legrange invariants. Subsequently, equation (55) can be reevaluated.

The maximum amount of time over which R vectors should be saved and used to compute $\vec{V}_0$ can be quantified as follows. The truncated F and G series is a poor estimator of the orbit if $t-t_0$ becomes too large. Since the series are truncated Taylor series, the nth term is proportional to $(t-t_0)^n$. Since the $4^{th}$ term is being truncated here, it is necessary to examine where that term's influence will be significant with respect to the desired error tolerance. The present invention is attempting to find positions on the order of 100 km error. A significant influence of the $(t-t_0)^4$ term would be considerably less than 100 km. A reasonable limit is 20 km, so that it is necessary to define $(t-t_0)$ such that:

$$F_4(t-t_0)^4 \vec{R}_0 + G_4(t-t_0)^4 \vec{V}_0 > 20 \text{ km} \tag{56}$$

In low earth orbit, $F_4$ is on the order of $10^{-14}$, $R_0$ is 7000 km, $G_4$ is on the order of $10^{-13}$, and $V_0 \approx 7$ km/sec leads to $(t-t_0)$ on the order 700 seconds. Therefore, the maximum amount of time over which position vectors should be saved and used to compute velocity vectors using this method is approximately 10 minutes.

The minimum time between two position vectors used to compute velocity is related to the velocity error requirement. When using only two position vectors, and without iteration equation (55) reduces to the difference in the vectors to determine $\vec{V}_0$. Therefore, the worst case error in velocity is the error in the difference in the two positions divided by the time between them. These values are limited by the desired performance. Further, when more than two position vectors are used in equation (55), $\vec{V}_0$ is determined by a least squares approximation and the error is reduced as a function of $1/\sqrt{n}$ where n is the number of position vectors used. This is a conservative estimate as the errors in $\vec{B}$ are correlated.

The embodiment of the invention in FIG. 3 (300) collects five minutes magnetometer data (302) from which position vectors were calculated and will be used to determine velocity. This value is less than the 10 minute recommended maximum value for the preset time period.

With velocity vectors determined, a magnitude for velocity can be determined for computing the total energy of each position path.

$$TE = \frac{1}{2}v^2 - \frac{\mu}{r} \tag{46}$$

Again, v is the magnitude of the velocity, r is the magnitude of the position vector, and $\mu$ is the earth's gravitational constant. The difference of the total energy at time t and time t+n minutes, $\Delta TE$, should be equal to zero plus some noise due to the measurement errors. Therefore, to select the true position path, the position path with the smaller abs($\Delta TE$) should be chosen. However, further quantification is required for the cases where either both abs($\Delta TE$) solutions are large or both close to zero. Assuming that there are errors in measurement, the difference between the total energy at two different times, $t_0$ and $t_n$, in orbit is:

$$\Delta TE = \frac{1}{2}(v_{t_0}^2 - v_{t_n}^2) + \mu\left(\frac{r_{t_0} - r_{t_n}}{r_{t_n}r_{t_0} + r_{t_0}\delta r_{t_n} + r_{t_n}\delta r_{t_0}}\right) + \tag{57}$$

$$(\delta v_{t_0} v_{t_0} - \delta v_{t_n} v_{t_n}) + \mu\left(\frac{\delta r_{t_0} - \delta r_{t_n}}{r_{t_n}r_{t_0} + r_{t_0}\delta r_{t_n} + r_{t_n}\delta r_{t_0}}\right)$$

$$\approx TE_{t_0} - TE_{t_n} + \frac{1}{2}(\delta v_{t_0} v_{t_0} - \delta v_{t_n} v_{t_n}) +$$

$$\mu\left(\frac{\delta r_{t_0} - \delta r_{t_n}}{r_{t_n}r_{t_0} + r_{t_0}\delta r_{t_n} + r_{t_n}\delta r_{t_0}}\right)$$

Therefore if:

$$\Delta TE = TE_{t_0} - TE_{t_n} + \delta TE \tag{58}$$

Then combining equations (57) and (58) yields:

$$\delta TE = (\delta v_{t_0} v_{t_0} - \delta v_{t_n} v_{t_n}) + \mu\left(\frac{\delta r_{t_0} - \delta r_{t_n}}{r_{t_n}r_{t_0} + r_{t_0}\delta r_{t_n} + r_{t_n}\delta r_{t_0}}\right) \tag{59}$$

Since it has been assumed that the spacecraft is in low earth orbit, any orbits must be nearly circular. The maximum eccentricity possible below 1000 km altitude has been shown to be 0.06. For a circular orbit, v and r are constant and $\delta v$ and $\delta r$ are latitude dependent. Worst case values for a given orbit for a given $\delta v$ and $\delta r$ can be estimated and $\delta TE$ calculated once. The quantity $\delta r_{t_0} - \delta r_{t_n}$ should equal the maximum $\delta r*2$ since that is the worst case difference between the two assuming the error in r is maximum positive at the end of the span and maximum negative at the beginning. Similarly, $\delta v_{t_0} v_{t_0} - \delta v_{t_n} v_{t_n}$ should equal $\delta v*v*2$. Therefore, in the worst case, equation (59) becomes:

$$\delta TE = 2\delta vv + \mu\left(\frac{2\delta r}{r^2}\right) \tag{60}$$

The true positon path cannot be definitively resolved until one of the abs($\Delta TE$) is greater than the error caused by the measurement noise as defined in equation (60).

Defn. A definitive ambiguity resolution occurs when exactly one solution is less than $\delta TE$. Further, if both abs($\Delta TE$) values are greater than $\delta TE$, then the ambiguity cannot be definitively broken.

For example, for a spacecraft in a circular orbit with an inclination of 82°, the maximum change in latitude a spacecraft needs to traverse for a definitive ambiguity resolution is 40°. However, the mean change in latitude is 4°. For that particular orbit, that change in latitude translates to a mean time of one minute. Simulations will also show that the instance of an incorrect choice of solution when one abs ($\Delta TE$) is less than $\delta TE$ and the other is greater than $\delta TE$ occurs only within 10° of the magnetic equator.

A constant value can be used for $\delta TE$ based on known error measurements for a vehicle so that $\delta TE$ is a predetermined noise factor.

In step (234) FIG. 2D, the program controlled processor calculates a total energy for the position solution obtained from the first measurement of the magnetic field data of the preset time period, and in step (236) another total energy for the last position solution of the preset time period. Step (238) computes a total energy difference for each position path. When both total energy differences have been computed (240), the differences are compared with a predetermined noise factor (242). If one is greater than the noise factor, that is not the true position path, so the other one is selected as the true position path (244). If neither difference is greater than the noise factor, than a true position path cannot be selected. The program controlled processor inputs another measurement and repeats the process (208).

Each position and velocity vector can be propagated to predict the positions up to about 10 minutes into the future using the above scheme, or even further as more $(t-t_0)$ terms are included. This scheme includes only the forces of the two bodies. The largest additional disturbing force is $J_2$, or the force due to the oblateness of the earth. Over an orbit average, $J_2$ tends to precess the ascending node as well as the argument of perigee (see Wertz, J. R. "Summary of Orbit Properties and Terminology," *Spacecraft Attitude Determination and Control*, J. R. Wertz (editor), Kluwer Academic Publishers, Dordrecht, The Netherlands, 1978, pp. 67–69). In order to study the short term effects of $J_2$, a Monte Carlo approach was taken. For 1000 randomly chosen initial conditions, low earth orbits were propagated ten minutes ahead using two different propagators. One propagator included only two body effects, while the other included $J_2$. The differences at the end of the ten minute spans were then examined statistically. The mean RSS difference was approximately 7 km, the standard deviation was 2 km, and the maximum was 13 km. When considering errors on the order of less than 50 km, a simple propagator with $J_2$ should be used. Therefore, during periods of time when the spacecraft passes near the magnetic equator and no deterministic solution is available, the orbit can be propagated.

Obviously, many modifications and variations of the present invention are possible in light of the above teachings. For example, the methods are not dependent on a particular coordinate system so different coordinate systems may be used such as geocentric inertial coordinates or earth centered, earth fixed coordinates. It is therefore to be understood that within the scope of the appended claims, the invention may be practiced otherwise than as specifically described.

What is claimed is:

1. A computer-implemented apparatus for autonomous position determination of a vehicle comprising:
    a memory having data, said data comprising measurements of magnetic field data for three axes represented in a fixed reference coordinate system, times of the magnetic field measurements, and Gaussian coefficients of an nth order model of series of spherical harmonics representing the core portion of the magnetic field as a gradient of a scalar potential function;
    said memory being accessible by a program controlled processor having a clock for generating timing pulses;
    said processor comprising an inverted dipole solutions module for calculating an inverted dipole solution comprising two position solutions, each position solution comprising a position vector for the vehicle and a vehicle distance from the center of the earth, for each measurement of three axes magnetic field data;
    said inverted dipole solution being stored as data in said memory; and
    said processor further comprising a position determination module for determining a position from the data stored in said memory.

2. The apparatus of claim 1 wherein said fixed reference coordinate system is geocentric inertial coordinates.

3. The apparatus of claim 1 wherein said fixed reference coordinate system is earth centered, earth fixed coordinates.

4. The apparatus of claim 1 wherein the Gaussian coefficients comprise all the coefficients of the 1990 10th order model of the International Geomagnetic Reference Field.

5. The apparatus of claim 1 further comprising:
    a magnetometer for providing measurements of magnetic field data for three axes;
    an analog to digital converter for converting measurements of magnetic field data into computer readable form;
    said memory further comprising attitude data;
    said processor further comprising a translation module translating the computer readable magnetic data from body coordinates to a fixed reference coordinate system by using the attitude data; and
    said translated magnetic field data being stored as data in memory.

6. The apparatus of claim 5 wherein the Gaussian coefficients comprise all the coefficients of the 1990 10th order model of the International Geomagnetic Reference Field.

7. The apparatus of claim 5 wherein said fixed reference coordinate system is geocentric inertial coordinates.

8. The apparatus of claim 5 wherein said fixed reference coordinate system is earth centered, earth fixed coordinates.

9. The apparatus of claim 7 wherein the Gaussian coefficients comprise all the coefficients of the 1990 10th order model of the International Geomagnetic Reference Field.

10. The apparatus of claim 8 wherein the Gaussian coefficients comprise all the coefficients of the 1990 10th order model of the International Geomagnetic Reference Field.

11. The apparatus of claim 1 wherein said measurements of magnetic field data for three axes are measured for a preset time period.

12. The apparatus of claim 5 wherein said measurements of magnetic field data for three axes are measured for a preset time period.

13. A computer-implemented method for autonomous position determination of a vehicle comprising the steps of:
    (a) a program controlled processor inputting a measurement of three axes magnetic field data, said magnetic field data being measured for a preset time period;
    (b) said processor determining whether a sufficient separation exists between the magnetic field vector of the measurement and a direction of a geomagnetic dipole according to a dipole characterization of the geomagnetic field, to insure convergence of a correction scheme to a position solution, wherein the dipole characterization is a first order of a series of nth order spherical harmonics representing the geomagnetic field as a gradient of a scalar potential function;
    (c) upon a determination of non-existence of the sufficient separation, step (a) and step (b) being repeatedly performed until a sufficient separation exists between the magnetic field vector and direction of the dipole;
    (d) a program controlled processor calculating an inverted dipole solution comprising two position solutions, each position solution comprising a position vector for the vehicle and a vehicle distance from the center of the earth, for each measurement of three axes magnetic field data;
    (e) storing each position solution of the inverted dipole solution in a separate set in memory;

(f) repeating steps (a) through (e) for each measurement of the magnetic field data measured for the preset time period thereby creating two sets of position solutions propagating two position paths for the vehicle with different directions; and (g) said processor determining which of the position paths is the true position path of the vehicle.

14. The method of claim 13, step (d) comprising the substeps:

(d1) determining two unit position vectors of the two position solutions in terms of the magnetic field vector and the direction of the dipole;

(d2) said processor calculating three possible solutions for the vehicle distance from the center of the earth from the magnetic field vector, the direction of the dipole and a total dipole strength of the geomagnetic field;

(d3) testing the three possible solutions to obtain one having a real nonnegative value as the vehicle distance from the center of the earth; and (d4) said processor applying a correction scheme to each of the two position solutions of the inverted dipole solution until a stopping criteria is satisfied.

15. The method of claim 14, step (g) comprising the substeps:

(g1) determining a velocity vector for each position solution in each position path of the vehicle;

(g2) for one position path, calculating a total energy for the position solution obtained from the first measurement of magnetic field data of the preset time period;

(g3) for the same position path, calculating a total energy for the position solution obtained from the last measurement of magnetic field data of the preset time period;

(g4) computing a difference of the total energies computed in steps (g2) and (g3) to obtain a first total energy difference;

(g5) obtaining a second total energy difference by repeating steps (g2) through (g4) for the other position path;

(g6) testing whether one total energy difference is greater than a noise factor, a constant predetermined value;

(g7) upon determining that one total energy difference is greater than the noise factor and one is less that the noise factor, selecting as the true position path of the vehicle, the position path having the total energy difference less than the noise factor.

16. The method of claim 14 wherein the correction scheme comprises a successive substitutions method having a stopping criteria of convergence within a number of iterations.

17. The method of claim 16 wherein step (d4) comprises the substeps:

(d14) said processor inputting from memory Gaussian coefficients for all orders of the nth order model of series of spherical harmonics to iteratively calculate the higher order terms of the model with each iteration of position data.

18. The method of claim 17 wherein said correction scheme further comprises following completion of said number of iterations for the successive substitutions method with applying a Newton-Raphson method for a second number of iterations.

19. The method of claim 15 wherein the preset time period is no more than ten (10) minutes.

20. The method of claim 19 wherein the preset time period is five minutes.

21. The method of claim 17 wherein said number of iterations is 20.

22. The method of claim 18 wherein said number of iterations for the successive substitutions is 20 and the second number of iterations is 5.

23. An computer-implemented apparatus for autonomous position determination of a terrestial entity comprising:

a magnetometer for providing a measurement of magnetic field data for three axes;

an analog to digital converter for converting measurements of magnetic field data into computer readable form;

a memory comprising a hemisphere location of the entity;

said memory further comprising attitude data;

a processor comprising a translation module translating the computer readable magnetic data from body coordinates to a fixed reference coordinate system by using the attitude data;

said translated magnetic field data being stored in memory;

said memory further comprising Gaussian coefficients of an nth order model of series of spherical harmonics representing the core portion of the magnetic field as a gradient of a scalar potential function;

said processor comprising an inverted dipole solutions module for calculating an inverted dipole solution comprising two position solutions, each position solution comprising a position vector for the entity and an entity distance from the center of the earth, for the measurement of three axes magnetic field data; and said processor comprising a position determination module for selecting a true position from the two position solutions based upon the hemisphere location.

24. An computer-implemented method for autonomous position determination of a terrestial entity comprising:

(a) obtaining a magnetic field measurement;

(b) determining whether a sufficient separation exists between the magnetic field vector of the measurement and a direction of a geomagnetic dipole according to a dipole characterization of the geomagnetic field, to insure convergence of a correction scheme to an inverted dipole position solution, wherein the dipole characterization is a first order of a series of nth order spherical harmonics representing the geomagnetic field as a gradient of a scalar potential function;

(c) upon a determination of existence of the sufficient separation, calculating an inverted dipole solution comprising two position solutions approximately 180 degrees apart, each position solution comprising a position vector for the entity and an entity distance from the center of the earth, for the measurement of three axes magnetic field data; and (d) selecting a true position from the two position solutions based upon a hemisphere location stored in a memory.

25. An computer-implemented method for autonomous position determination of a terrestial entity comprising:

(a) a magnetometer obtaining a magnetic field measurement in body coordinates;

(b) said magnetic field measurement being converted to computer readable form by an analog to digital converter;

(c) said magnetic field data being translated to a fixed reference coordinate system by using attitude data stored in a memory, said memory further comprising a hemisphere location of the entity (d) determining whether a sufficient separation exists between the magnetic field vector of the measurement and a direction of a geomagnetic dipole according to a dipole characterization of the geomagnetic field, to insure convergence of a correction scheme to a position solution, wherein the dipole characterization is a first order of a series of nth order spherical harmonics representing the geomagnetic field as a gradient of a scalar potential function;

(e) upon a determination of non-existence of the sufficient separation, step (a) through step (d) being repeatedly performed until a sufficient separation exists between the magnetic field vector and direction of the dipole;

(f) calculating an inverted dipole solution comprising two position solutions approximately 180 degrees apart, each position solution comprising a position vector for the entity and an entity distance from the center of the earth, for the measurement of three axes magnetic field data; and (g) selecting a true position from the two position solutions based upon the hemisphere location for the measurement.

* * * * *